3,720,030
METHOD AND APPARATUS FOR ATTACHING A MOLDING BETWEEN THE FRAME OF A VEHICLE AND AN EXPOSED EDGE OF A WINDOW PANE INSTALLED IN THE FRAME
Otto Krodel, Sindelfingen, Germany, assignor to Daimler-Benz Aktiengesellschaft, Stuttgart, Unterturkheim, Germany
Filed Mar. 5, 1971, Ser. No. 121,396
Claims priority, application Germany, Mar. 6, 1970, P 20 10 564.0
Int. Cl. E04f 19/02; E04c 2/02
U.S. Cl. 52—400
7 Claims

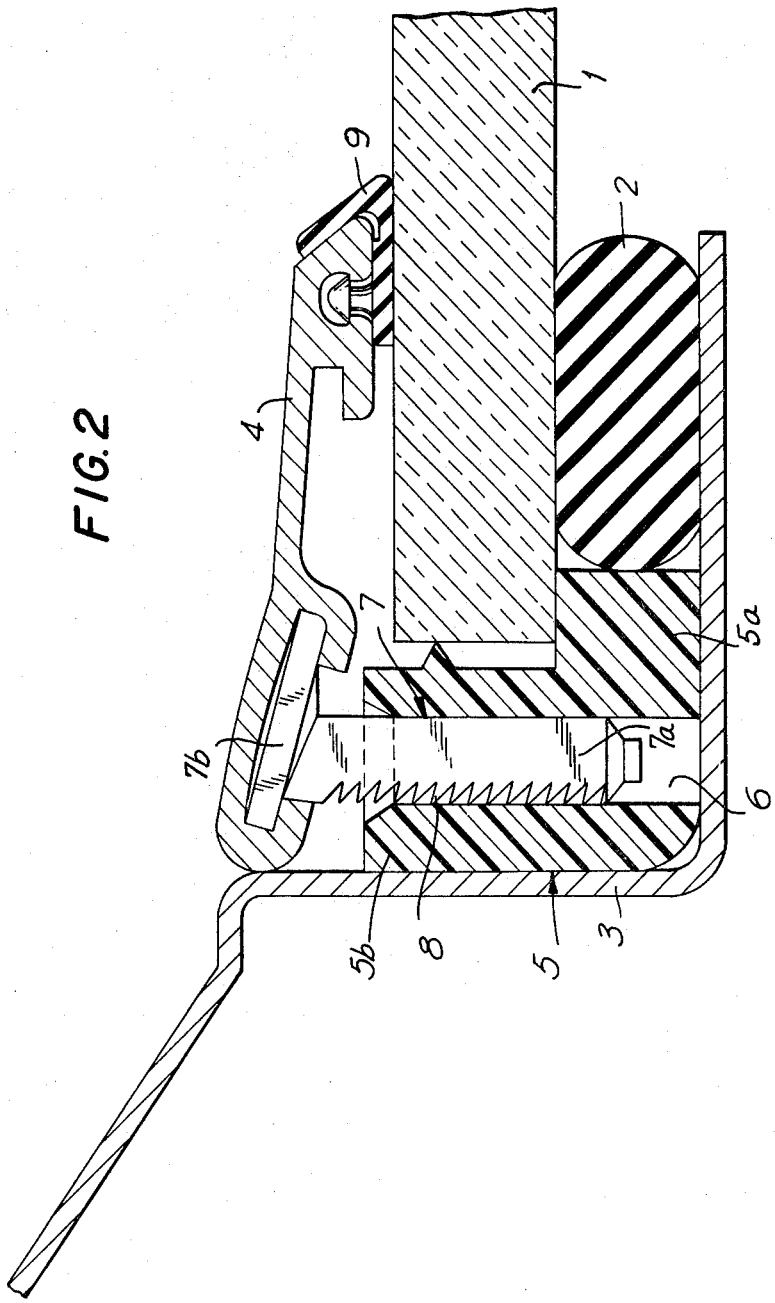

ABSTRACT OF THE DISCLOSURE

A molding strip is mounted in the space between the exposed edge of a window pane and a frame in which the pane is installed by means of a retainer constituted of two parts which are interengaged by pushing one into the other. A first part is attached to the molding strip and has a projecting stem and a second part of L shape is mounted on the frame with one leg inserted beneath the pane, the other leg having a recess into which the stem is pushed. The stem is provided with projections to insure gripping in the recess.

BRIEF SUMMARY OF THE INVENTION

The invention relates to methods and apparatus for attachment of moldings in motor vehicles to cover the space between a frame and an exposed edge of a window pane installed in the frame.

Such window pane may be any fixed window in a vehicle inclusive of the windshield.

In order to prevent the development of forces in the window pane from the frame when the latter is stressed, the pane must be spaced from the frame, and these spaces are covered by moldings for aesthetic purposes.

An object of the invention is to provide a means whereby such a molding can be securely and inexpensively fastened.

A further object of the invention is to provide a method by which the molding can be easily and rapidly fitted in place by a simple pushing operation.

According to the invention, an apparatus is provided for covering the space between the frame of the vehicle and a window pane installed therein, said apparatus comprising a molding strip adapted for engaging the frame and the exposed edge of the window pane to cover said space and retaining means composed of two plastic parts wherein the first part is of L shape and one leg is inserted under the edge of the window pane such that it rests on the frame while the other leg extends adjacent the edge of the window pane and is provided with a recess, the scond part having a head engaged in a shaped recess in the molding strip and a depending stem which is engaged in the recess in the first part by being pushed thereinto. The stem is provided with gripping means in the form of projections to enhance the interengagement between the parts.

According to the method of the invention the molding strip is installed merely by pushing the stem on the second part into the recess of the first part until the edges of the the molding strip respectively press against the window pane and frame.

BRIEF DESCRIPTION OF THE DRAWING

FIG. 2 is a sectional view through the assembled installation on an enlarged scale.

DETAILED DESCRIPTION

Figure 1:
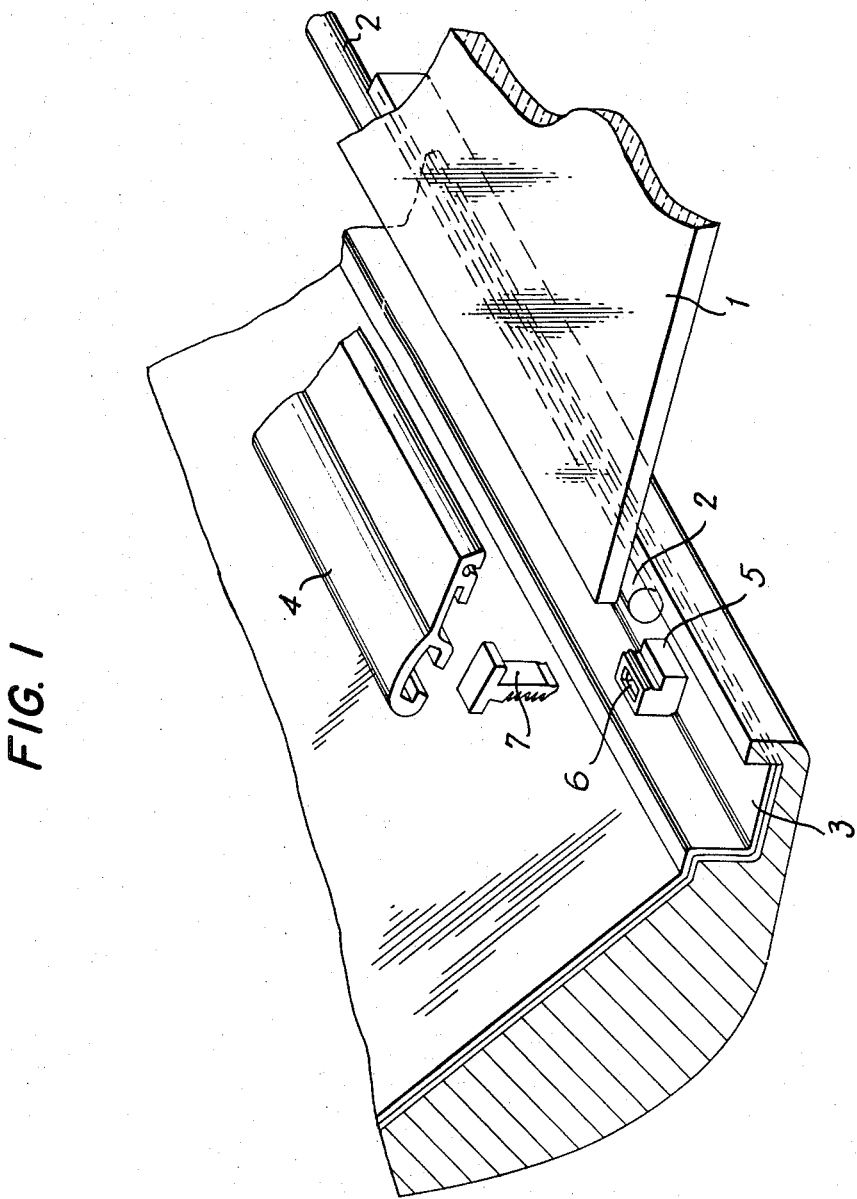
FIG. 1 is an exploded perspective view of a portion of an installation of a window pane according to the invention.

Referring to the drawing therein is seen a window pane 1 of a vehicle which may be a fixed pane such as a windshield. The window pane is installed in the vehicle on an adhesive weather strip or gasket 2 in a rigid frame 3 which is firmly connected to the vehicle body. The edge of the window pane is exposed and spaced from the frame in floating condition so that stress in the frame will not be transmitted to the window pane. The space between the exposed edge of the window pane and the frame is covered by a molding strip 4 extending along the entire length of the exposed edge of the pane.

In order to attach the molding strip so that it covers the space and bears against the pane 1 and the frame 3, a retainer means is employed which comprises two interengaging parts. The first of the two interengaging parts is a part 5 of L-shape with a leg 5a inserted between the frame 3 and the surface of the pane 1 opposite the surface against which strip 4 bears. The part 5 includes a second leg 5b inserted between the edge of the pane and the frame and leg 5b is provided with a recess 6. The second of the two interengaging parts is a part 7 which comprises a stem 7a which can be pushed into recess 6 and a head 7b on stem 7a engaged in a corresponding shaped recess in strip 4. The stem 7a is provided with a gripping means in the form of projections 8 to facilitate the clamping effect of the stem in the recess. The head 7b is inclined on stem 7a to develop pressure between the end of strip 4 and the pane 1 when the stem 7a is pushed into recess 6. A protective strip 9 of rubber or plastic is mounted on the end of molding strip 4 where it contacts the pane 1 to provide resilient contact therewith.

In the installed condition shown in FIG. 2, the pane 1 rests on the leg 5a of part 5 and compresses the gasket 2 therebeneath against the frame 3.

It is to be understood that a number of interengaging parts 5 and 7 may be placed along the length of the edge of the pane 1 depending upon the magnitude of such length.

In the method of mounting the strip 4 to cover the space between the edge of the pane 1 and the frame 3, the parts 5 have been inserted underneath pane 1 and firmly rest on frame 3. The heads of a corresponding number of parts 7 are inserted in the shaped recesses in strip 4 so that the stems 7a depend from the strip 4. The stems are then inserted in succession into the recesses 6 of corresponding parts 5 until the strip 9 in the molding strip 4 is pressed against the pane 1. The projections 8 on the stems 7a firmly hold the steps in the parts 5 to provide a tight and reliable assembly. The molding strip 4 can be thus securely and easily fastened in relatively inexpensive fashion.

Experiments have shown that an exceptionally simple attachment of the molding strip has been obtained by the arrangement according to the invention, which is adaptable to the case of occasionally occurring greater production tolerances.

What is claimed is:

1. Apparatus for covering the space between a frame of a vehicle and an exposed edge of a window pane to be installed in said frame, said apparatus comprising a molding strip adapted for engaging the frame and the window pane at the exposed edge to cover the space between the frame and the window pane, and retainer means on said frame and engaging the molding strip to hold said strip in engagement with the window pane and frame, said retainer means comprising a plurality of L-shaped individual and separate first parts resting on said frame and disposed along the length of the surface of the window pane opposite the surface engaged by the molding strip, each L-shaped part including one leg disposed beneath the window pane and a second leg extending upwardly adjacent the edge of the pane, said second leg being provided with an individual recess, and a plurality of individual and separate second parts, each including a head supported in said molding strip and a stem pushably engageable in the recess of a corresponding first part.

2. Apparatus as claimed in claim 1 comprising a gasket on said frame adjacent said one legs of the first parts and compressed beneath the window pane upon insertion of the stems into said recesses.

3. Apparatus as claimed in claim 1 wherein said molding strip has opposite longitudinal edges and a shaped recess at one edge receiving the heads of said second parts, said other of the edges of the molding strip being pressed against the window pane when the stems are inserted in the recesses in the first parts.

4. Apparatus as claimed in claim 3 wherein said heads are inclined with respect to said stems to press the said other of the edges of the molding strip against the window pane when the stems are engaged in said recesses.

5. Apparatus as claimed in claim 1 comprising gripping means between said stem and said recess in the first part.

6. Apparatus as claimed in claim 5 wherein said gripping means comprises projections in said stem for gripping the stem in said recess.

7. Apparatus as claimed in claim 6 wherein said first and second parts are constituted of plastic material.

References Cited
UNITED STATES PATENTS

| | | | |
|---|---|---|---|
| 3,028,938 | 4/1962 | Schorr | 52—400 |
| 3,367,077 | 2/1968 | Johnston | 52—397 |
| 3,487,601 | 1/1970 | James | 52—400 |
| 3,492,770 | 2/1970 | Furner | 52—400 |
| 3,634,991 | 1/1972 | Barton et al. | 52—403 |

FRANK L. ABBOTT, Primary Examiner

J. L. RIDGILL, Jr., Assistant Examiner

U.S. Cl. X.R.

52—506, 717